(12) United States Patent
Wagner

(10) Patent No.: US 9,722,491 B2
(45) Date of Patent: Aug. 1, 2017

(54) METHOD AND APPARATUS FOR OPERATING A SWITCHMODE POWER SUPPLY

(71) Applicant: MOTOROLA MOBILITY LLC, Chicago, IL (US)

(72) Inventor: Daniel H. Wagner, Grayslake, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 332 days.

(21) Appl. No.: 14/512,702

(22) Filed: Oct. 13, 2014

(65) Prior Publication Data

US 2016/0105102 A1    Apr. 14, 2016

(51) Int. Cl.
*H02M 3/156* (2006.01)
*H02M 1/12* (2006.01)
*H02M 1/42* (2007.01)

(52) U.S. Cl.
CPC .............. *H02M 3/156* (2013.01); *H02M 1/12* (2013.01); *H02M 1/126* (2013.01); *H02M 1/4225* (2013.01)

(58) Field of Classification Search
CPC ........ H02M 1/42; H02M 1/4208; H02M 1/12; H02M 1/4225; H02M 1/4233; H02M 1/4241; H02M 1/4258; H02M 2001/4283; H02M 2001/4291; H02M 3/156; H02M 3/155; H02M 3/145; H02M 3/158; H02M 3/1588; H02M 2003/1552; G05F 1/70; H02J 3/16
USPC .................................................. 327/551–559
See application file for complete search history.

(56) References Cited

U.S. PATENT DOCUMENTS

| | | | |
|---|---|---|---|
| 2013/0049816 A1 | 2/2013 | Cioci | |
| 2014/0218984 A1* | 8/2014 | Lee | H02M 7/44 363/95 |
| 2014/0320086 A1* | 10/2014 | Wallis | H02J 7/0044 320/115 |
| 2015/0117074 A1* | 4/2015 | Miao | H02M 1/4225 363/44 |

* cited by examiner

*Primary Examiner* — Harry Behm
*Assistant Examiner* — Bryan R Perez
(74) *Attorney, Agent, or Firm* — Morris & Kamlay LLP

(57) ABSTRACT

A method and apparatus operate a switchmode power supply. The apparatus can include a pulse width modulation controller that can produce a first pulse width modulation signal at a first frequency. The apparatus can include a switchmode power supply switching element including a control terminal. The apparatus can include a harmonic filter coupled between the pulse width modulation controller and the control terminal of the switching element. The harmonic filter can provide a second pulse width modulation signal at a second frequency to the control terminal of the switching element. The second frequency can be higher than the first frequency.

19 Claims, 7 Drawing Sheets

METHOD AND APPARATUS FOR OPERATING A SWITCHMODE POWER SUPPLY

BACKGROUND

1. Field

The present disclosure is directed to a method and apparatus for operating a switchmode power supply. More particularly, the present disclosure is directed to operating a switchmode power supply at a higher frequency than a pulse width modulation controller pulse width modulation frequency.

2. Introduction

Presently, a switchmode power supply is an electronic power supply that incorporates a switching regulator to convert electrical power efficiently. The switchmode power supply transfers power from a source to a load, such as a portable electronic device, while converting voltage and current characteristics. A pass transistor of a switchmode supply continually switches between low-dissipation, full-on, and full-off states, and spends very little time in the high dissipation transitions, which minimizes wasted energy. Voltage regulation is achieved by varying the ratio of on-to-off time.

Switchmode power supplies that are designed around digital controllers are limited in operational frequency by the maximum computational speed of the digital controller that supplies the switching signal. For example, adequate pulse width modulation duty cycle control, such as with 6 bits or more, requires dividing down the controller clock, so a 16 MHz controller can only operate a 400 kHz switchmode supply at 6 bits, where 400 kHz=16 MHz/2^6. Also, digital switchmode power controllers are limited in their output voltage swing and cannot drive typical power semiconductor devices without buffers and level shifting, which cost space, money, and power.

Thus, there is a need for an improved method and apparatus for operating a digitally controlled switchmode power supply.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus that operates a digitally controlled switchmode power supply. The apparatus can include a pulse width modulation controller that can produce a first pulse width modulation signal at a first frequency. The apparatus can include a switchmode power supply switching element including a control terminal. The apparatus can include a harmonic filter coupled between the pulse width modulation controller and the control terminal of the switching element. The harmonic filter can provide a second pulse width modulation signal at a second frequency to the control terminal of the switching element. The second frequency can be higher than the first frequency.

Figure 1:
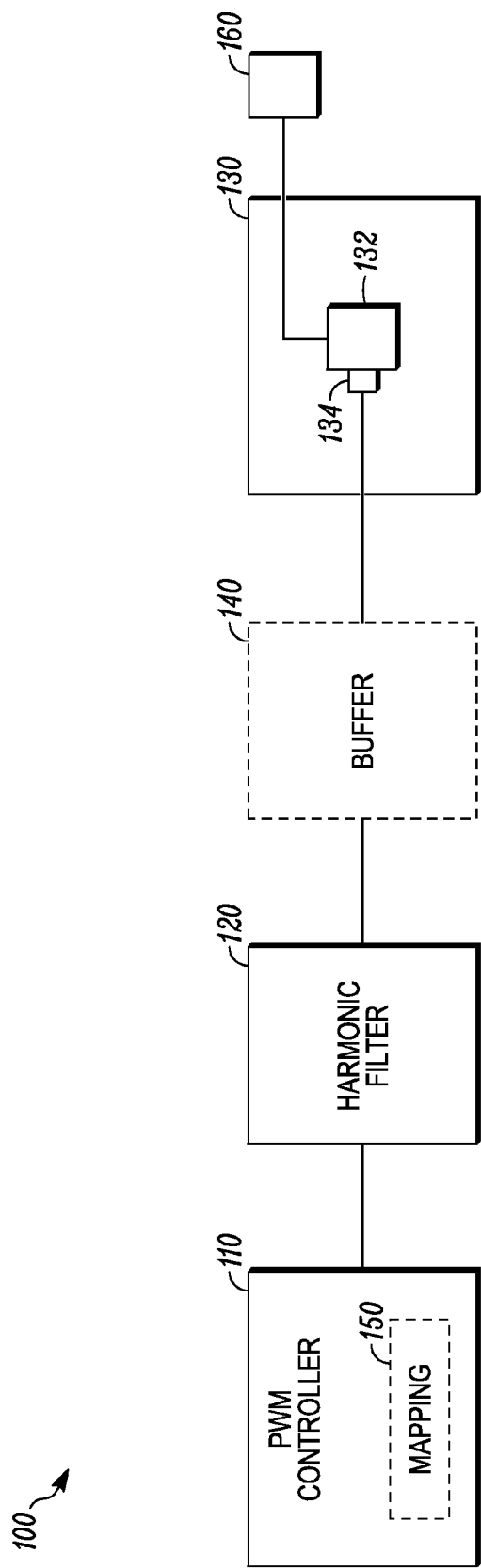
FIG. 1 is an example block diagram of an apparatus according to a possible embodiment.

FIG. 1 is an example block diagram of an apparatus 100 according to a possible embodiment. The apparatus 100 can include a pulse width modulation controller 110. The controller 110 can produce a first pulse width modulation signal at a first frequency. The controller 110 can be a digital controller, an analog controller, a combination digital and analog controller, or can be any other pulse width modulation controller. According to other embodiments, the controller 110 may implement an operating system, such as Microsoft Windows®, UNIX, or LINUX, Android, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in a memory or elsewhere on the apparatus 100. The apparatus 100 or the controller 110 may also use hardware to implement operations. For example, the controller 110 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 110 may be any controller or processor device or devices capable of operating an electronic device and implementing the disclosed embodiments.

The apparatus 100 can include a switchmode power supply switching element 132 including a control terminal 134. The switching element 132 can be part of a switchmode converter 130, such as a switchmode power supply. According to another embodiment, the entire apparatus 100 or portions of the apparatus 100 can be considered a switchmode power supply. The switching element 132 can be a Field Effect Transistor (FET), a Bipolar Junction Transistor (BJT), an Insulated Gate Bipolar Transistor (IGBT), a Triode for Alternating Current (TRIAC), or any other switching element. The control terminal 134 can be a gate of a FET, a base of a BJT, a gate of an IGBT, a gate of a TRIAC, or any other control terminal of a switching element.

The apparatus 100 can include a harmonic filter 120 coupled between the pulse width modulation controller 110 and the control terminal 134 of the switching element 132. The harmonic filter 120 can provide a second pulse width modulation signal at a second frequency to the control terminal 134, where the second frequency can be higher than the first pulse width modulation signal first frequency. For example, the second frequency can be a multiple of the first frequency. As another example, the second frequency can be one or more harmonic frequencies of the first frequency that are greater than a second order harmonic of the first frequency The harmonic filter 120 can be dynamically configurable to select at least one selected filtered harmonic frequency of the first frequency as the second frequency. For example, the harmonic filter 120 can be a band-pass filter that band-passes only one or more predetermined harmonics of the first frequency while filtering out the first frequency, where the second frequency is one of the predetermined harmonics of the first frequency. To elaborate, the harmonic filter 120 can be a band-pass filter that can be interposed between a pulse width modulation output of the pulse width modulation controller 110, such as a microcontroller, and the control terminal 134, such as a gate of a power semiconductor. The band-pass filter can be designed such that the 3rd and/or higher order harmonic(s) of a pulse width modulation drive signal from the microcontroller is coupled to the gate of the power semiconductor. This can operate the power semiconductor switch at increased speeds, which can permit more power delivery with smaller switched mode converter components, such as power inductors and capacitors. The band-pass filter can be dynamically configured as to which order(s) of the pulse width modulation drive signal are to be coupled to the gate of the power semiconductor. The harmonic filter 120 can also be a high-pass filter that filters out the first frequency and passes the second frequency, where the second frequency can be a harmonic of the first frequency. The harmonic filter 120 can be any other element that filters out or substantially attenuates the fundamental first-order harmonic component of the first frequency such that the result is dominated by higher-order harmonic content.

The second pulse width modulation signal can have a voltage and the harmonic filter 120 can have a quality factor greater than one to resonate up the voltage of the second pulse width modulation signal to switch the switching element 132 between on and off states of the switching element 132. For example, the harmonic filter 120 can be a band-pass filter and a quality factor, Q, of the band-pass filter can be >1, which can resonate up the voltage of the second pulse width modulation signal, such as a pulse width modulation control signal, high enough to switch the switching element 132 between desired on/low-resistance and off/high-resistance states.

The switching element 132 can have a Direct Current (DC) gate bias and the second pulse width modulation signal can be superimposed on the DC gate bias. For example, the harmonic filter 120 can be Alternating Current (AC)-coupled to the switching element 132 so that the second pulse width modulation signal, such as an AC drive signal, can be superimposed on a DC gate bias. This can make the switching element 132 more easily switched with a minimum of peak-to-peak net voltage excursion. The DC gate bias can be actively managed for further duty cycle control and/or modulation of the switching element 132, such as a power switch.

According to a possible embodiment, the pulse width modulation controller 110 can provide the first pulse width modulation signal at the first frequency to the harmonic filter 120. The harmonic filter 129 can generate the second pulse width modulation signal at the second frequency from the first pulse width modulation signal, where the second frequency can be a multiple of the first frequency of the first pulse width modulation signal. The switchmode power supply switching element 132 can then operate at the second frequency based on the second pulse width modulation signal.

The apparatus 100 can optionally include a buffer 140 coupled between the harmonic filter 120 and the switchmode power supply switching element. The buffer 140 can square up the second pulse width modulation signal. For example, if the second pulse width modulation signal has a curved waveform and/or includes voltage fluctuations, the buffer 140 can be used to make the second pulse width modulation signal more of a square wave to more accurately or efficiently operate the switching element 134.

The apparatus 100 can also optionally include a mapping module 150. The mapping module 150 can map a desired second pulse width modulation signal second duty cycle to a first pulse width modulation signal first duty cycle. The pulse width modulation controller 110 can produce the first pulse width modulation signal with the first duty cycle so the harmonic filter 120 can provide the second pulse width modulation signal with the second duty cycle to the switchmode power supply switching element 132. For example, a net power switch duty cycle resultant from a given band-pass function of a given originating pulse width modulation signal, in conjunction with a given DC gate bias, can be different than the duty cycle of the originating pulse width modulation signal, but the difference can be deterministic. A look-up table or dynamic calculation of the mapping module 150 can compensate for this signal transformation. That is, the pulse width modulation controller 110, intending for a power switch duty cycle Y1%, can originate a pulse width modulation signal of duty cycle X1%, based on a mapping function from X % to Y %. This can be likened to how the playing of a woodwind instrument requires mapping of a linear pitch function to one of a variety of non-linear fingering patterns, rather than the linear fingering progressions of string instruments. In all other aspects of loop control, the switchmode converter 130, such as a switchmode supply, can be operated as conventionally done, but now at increased speed, and therefore with smaller and less expensive components. A further advantage of operation at increased speed can be that of reduced output voltage ripple. The apparatus 100 can also include a port 160 that can couple an output of the switchmode converter 130 to an electronic device to provide power to the electronic device.

Figure 2:
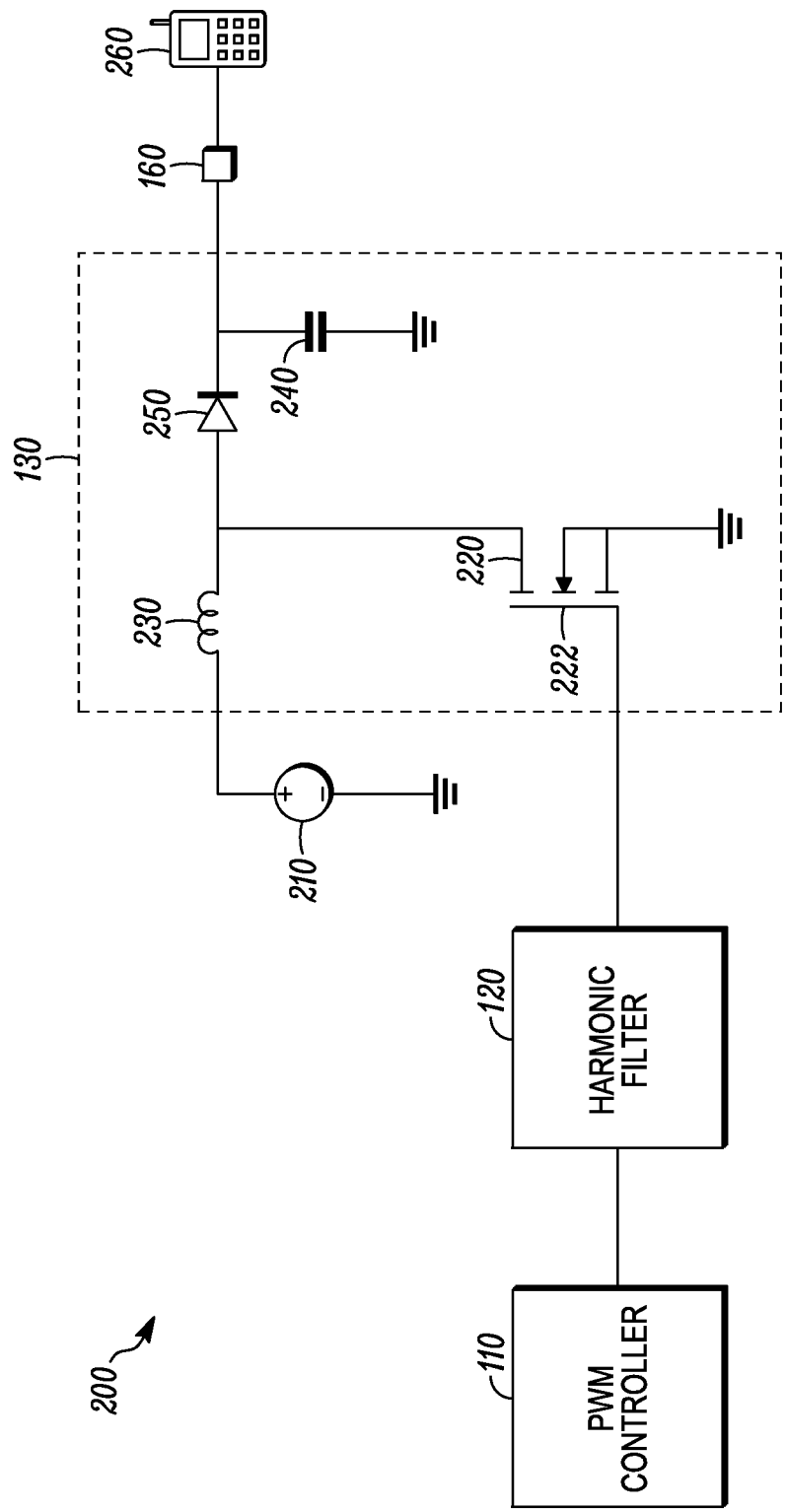
FIG. 2 is an example conceptual diagram of an apparatus according to a possible embodiment.

FIG. 2 is an example conceptual diagram of an apparatus 200, such as the apparatus 100, according to a possible embodiment. The apparatus 200 can include the pulse width modulation controller 110, the harmonic filter 120, and the switchmode converter 130, such as a switchmode power supply. The apparatus 200 can also include a DC voltage source 210 and the port 160. The apparatus 200 can be coupled to an external electronic device 260, such as a portable phone, a cellular phone, a selective call receiver, a smartphone, a tablet computer, a personal computer, a laptop computer, a multimedia player, or any other device that can receive power from a switchmode power supply via the port 160. Alternatively, the device 260 can be an internal load or set of loads within the same larger apparatus as the switchmode power supply 200.

According to this embodiment, the diagram of the apparatus 200 also illustrates possible primary functional components of the switchmode converter 130. These functional components can include a transistor 220, such as the switch 132 and the transistor 220 can include a gate 222, such as the control terminal 134. The switchmode converter 130 can additionally include a diode 250 and energy storage components, such as an inductor 230 and a capacitor 240. The switchmode converter 130 may also contain many other components, such as biasing resistors, capacitors, and other components. In operation, the pulse width modulation controller 110 can generate a first pulse width modulation signal with a first frequency to the harmonic filter 120. The harmonic filter 120 can provide a second pulse width modulation signal with a second frequency to the gate 222 based on the first pulse width modulation signal, where the second frequency can be greater than the first frequency. The DC power supply 210 can provide energy to the inductor 230. The gate 222 can switch the transistor 220 between on and off states based on the second pulse width modulation signal to provide energy from the inductor 230 through the diode 250 to charge the capacitor 240. The gate 220 can switch faster using the higher frequency second pulse width modulation signal than a gate without the harmonic filter 120. The capacitor 240 can then provide power at a substantially constant given voltage to the electronic device 260 via the port 160.

Figure 3:
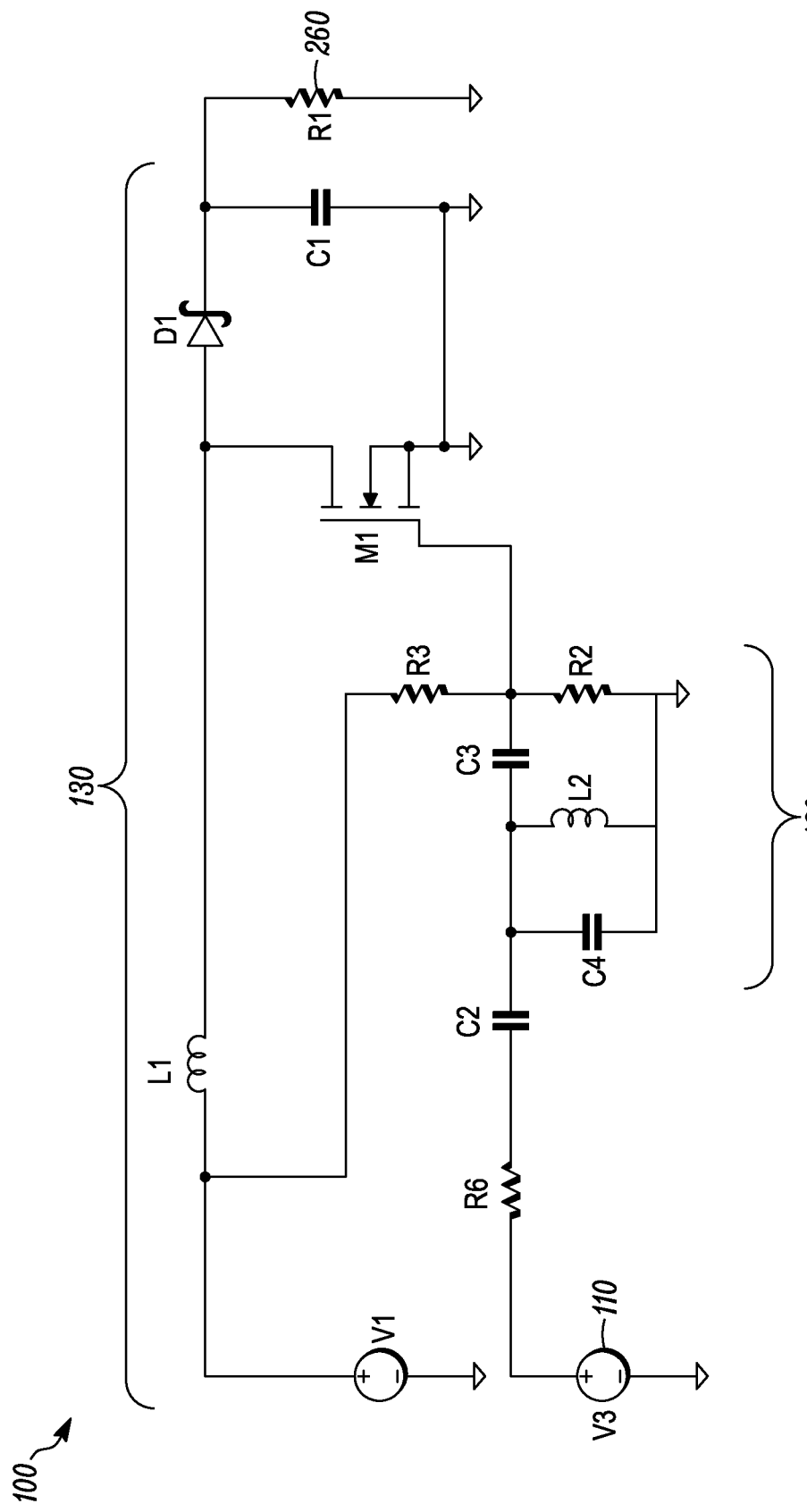
FIG. 3 is an example illustration of an apparatus according to another possible embodiment.

FIG. 3 is an example illustration of an apparatus 300, such as the apparatus 100, according to another possible embodiment. The apparatus 300 can include the pulse width modulation controller 110, illustrated here as a voltage source of a first pulse width modulation signal with a first frequency. The apparatus 300 can also include the harmonic filter 120 illustrated here as a resonant band-pass filter. For example, the harmonic filter 120 can include capacitors C3 and C4, inductor L2, and resistor R2. The apparatus 300 can additionally include other components, such as the resistor R6 and the capacitor C2 coupled between the pulse width modulation controller 110 and the harmonic filter 120. The apparatus 300 can further include the switchmode converter 130. According to this embodiment, the switched mode converter 130 can include a switching element M1, a voltage source V1, an inductor L1, a diode D1, and a capacitor C1. The diode D1 may be replaced by another output rectifier or by an active power switching element, such as a Metal-Oxide-Semiconductor Field-Effect Transistor (MOSFET). The switching element M1 can be semiconductor switching device, a MOSFET, a bipolar transistor, an Insulated Gate Bipolar Transistor (IGBT), or any other switching element. The apparatus 300 can be coupled to the electronic device 260 illustrated here as a load R1. The apparatus 300 can operate as described with respect to the apparatus 200, where the individual components are shown as a basic example of a possible embodiment. In this version, the pulse width modulation controller 110 may only put out a 500 KHz first pulse width modulation signal while still retaining 5-bit resolution. The harmonic filter 120 can provide a 1.5 MHz pulse width modulation signal to the boost converter comprised of L1, M1, D1, and C1. In this embodiment the inductor L1 and capacitor C1 power passives can now be approximately ⅔rds smaller and approximately ⅓rd less expensive than those in a switched mode converter operating without the harmonic filter 120. The apparatus 300 can also provide voltage feedback (not shown) from the output of the capacitor C1 to the pulse width modulation controller 100 so the controller 100 can make any desired adjustments that affect the output, such as those which would maintain a regulated voltage output despite variations in DC source voltage and variation of load current requirements.

Figure 4:
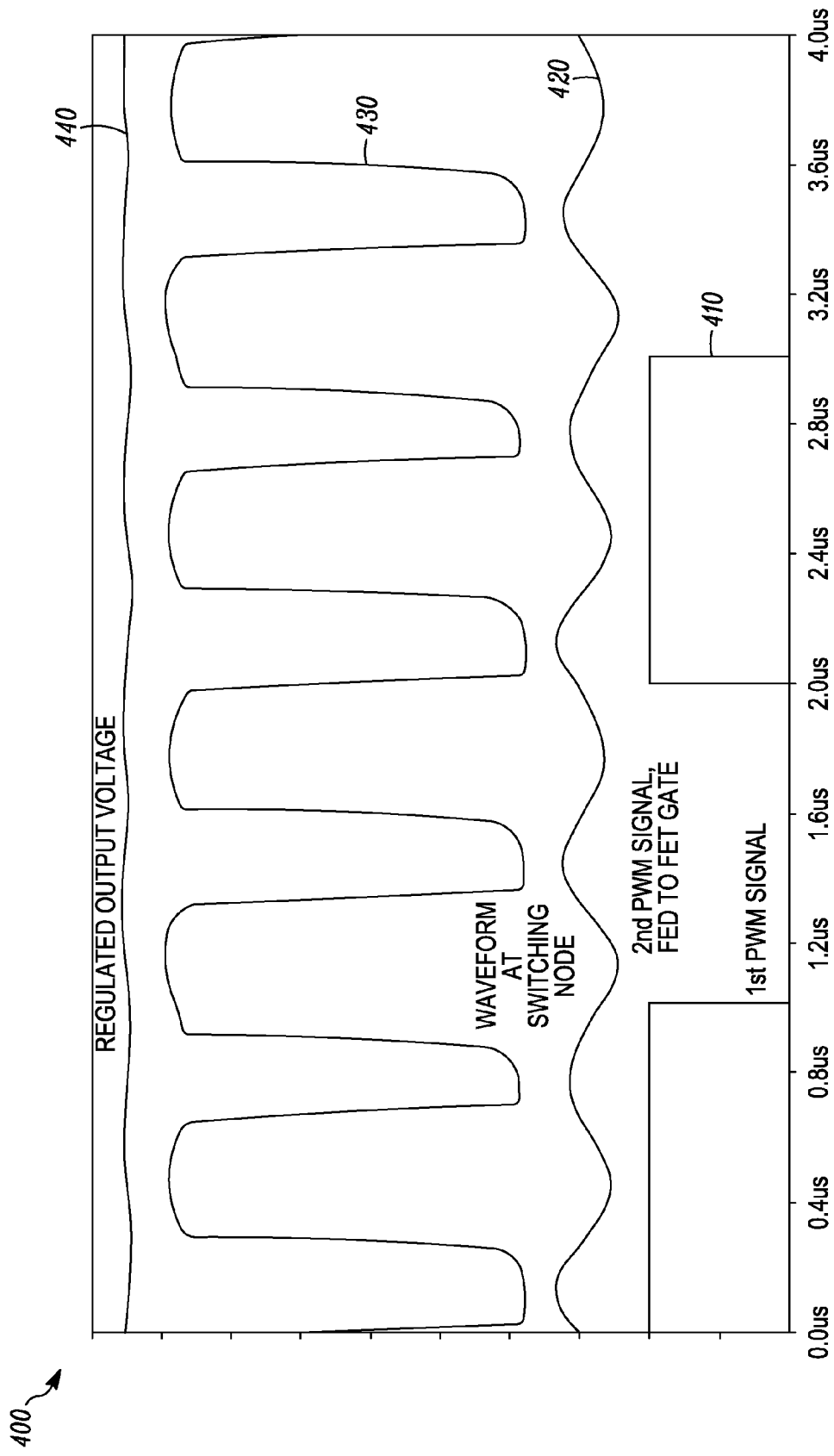
FIG. 4 is an example graph showing waveforms of an apparatus according to a possible embodiment.

FIG. 4 is an example graph 400 showing waveforms of the apparatus 300 according to a possible embodiment. The graph 400 includes a first pulse width modulation signal 410, a second pulse width modulation signal 420, a switching node signal 430, and an output signal 440. The first width pulse modulation signal 410 can be a 500 KHz signal output from the pulse width modulation controller 110 sent to the harmonic filter 120. The second pulse width modulation signal 420 can be a 1.5 MHz harmonic of the first pulse width modulation signal 410 sent from the harmonic filter 120 to a switching element M1. The switching node signal 430 can be a signal at a drain of a FET switching element M1 or other comparable output of a switching element. The output signal 440 can be an output voltage that provides power to an electronic device 260.

Figure 5:
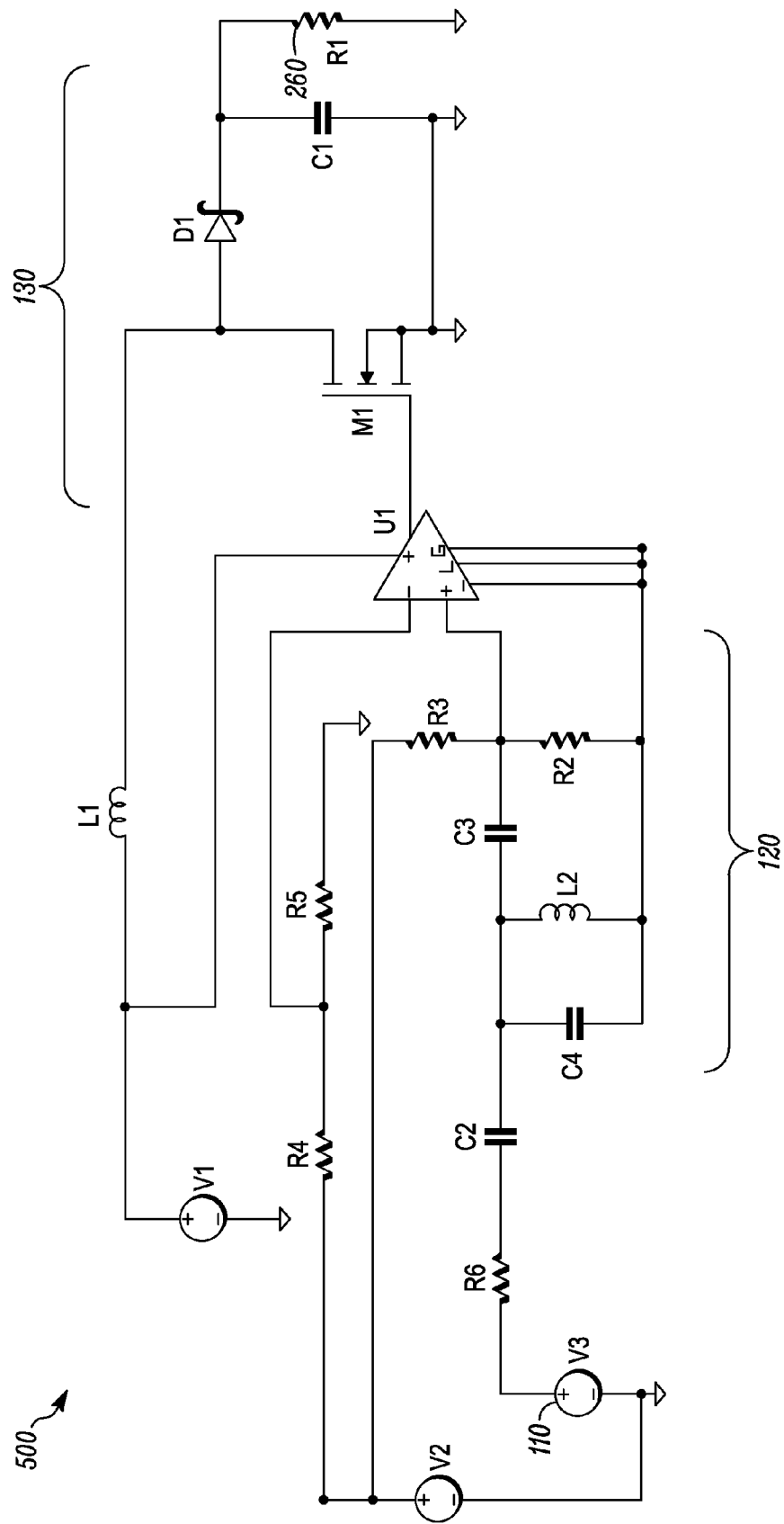
FIG. 5 is an example illustration of an apparatus according to another possible embodiment.

FIG. 5 is an example illustration of an apparatus 500, such as the apparatus 300, according to another possible embodiment. The apparatus 500 can include similar components described with respect to apparatus 300. The apparatus 500 can further include another voltage source V2, resistors R4 and R5, and a buffer active element U1, such as a comparator. In operation, the active element U1 can square up the second pulse width modulation signal from the harmonic filter 120 to the switch-mode converter 130 for higher efficiency. This can also introduce the ability for a digital control loop to regulate the comparator U1 threshold for increased "vernier" control, beyond the base number of bits of duty cycle granularity available in the controller 110.

Figure 6:
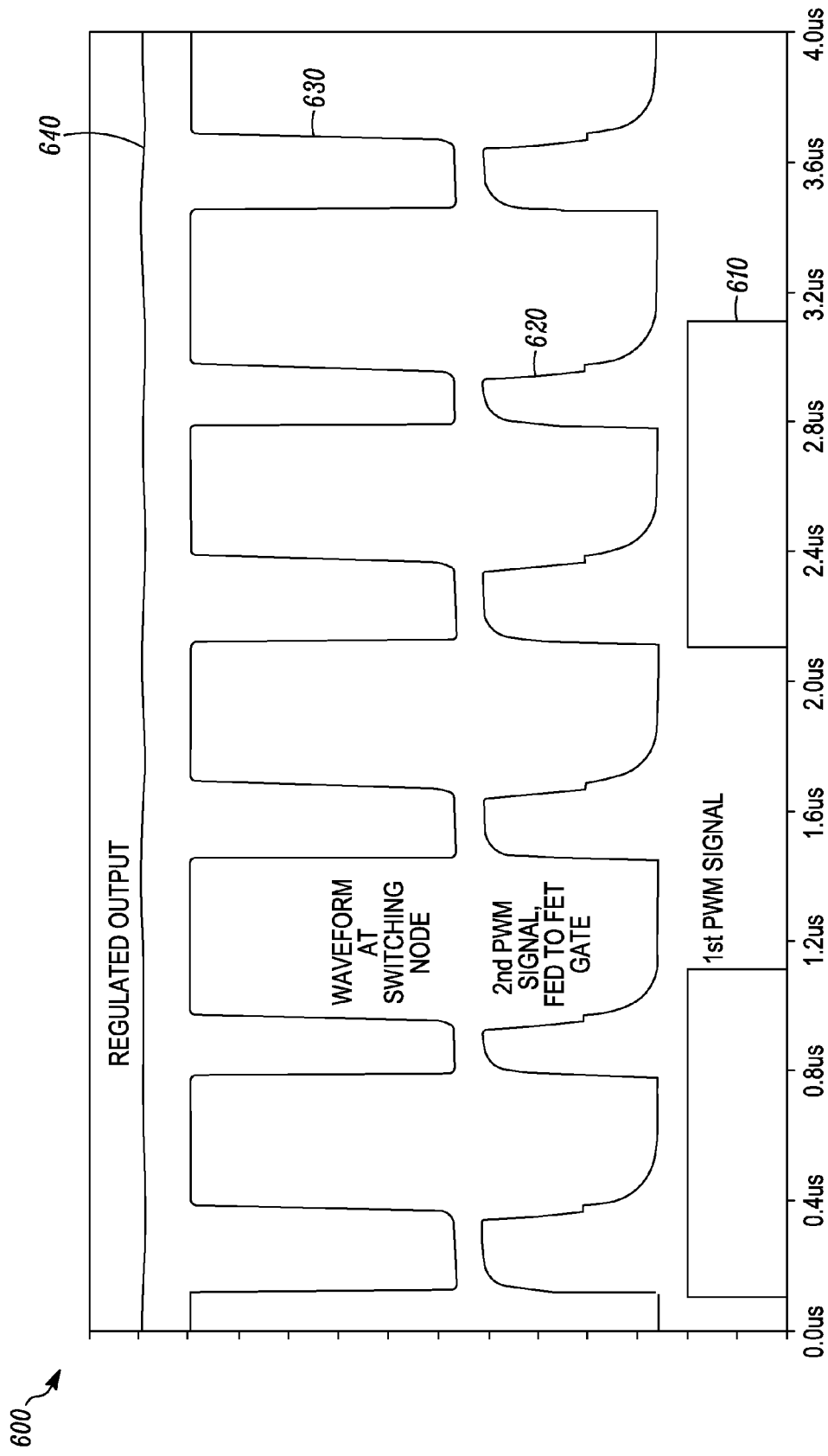
FIG. 6 is an example graph showing waveforms of an apparatus according to a possible embodiment.

FIG. 6 is an example graph 600 showing waveforms of the apparatus 600 according to a possible embodiment. The graph 600 includes a first pulse width modulation signal 610, a second pulse width modulation signal 620, a switching node signal 630, and an output signal 640. The first pulse width modulation signal 610 can be a 500 KHz signal output from the pulse width modulation controller 110 sent to the harmonic filter 120. The second pulse width modulation signal 620 can be a squared up 1.5 MHz harmonic of the first pulse width modulation signal 610 sent from the harmonic filter 120 through a buffer active element U1 to a switching element M1. The switching node signal 630 can be a signal at a drain of a FET switching element M1 or other comparable output of a switching element. The output signal 640 can be an output voltage that provides power to an electronic device 260.

Figure 7:
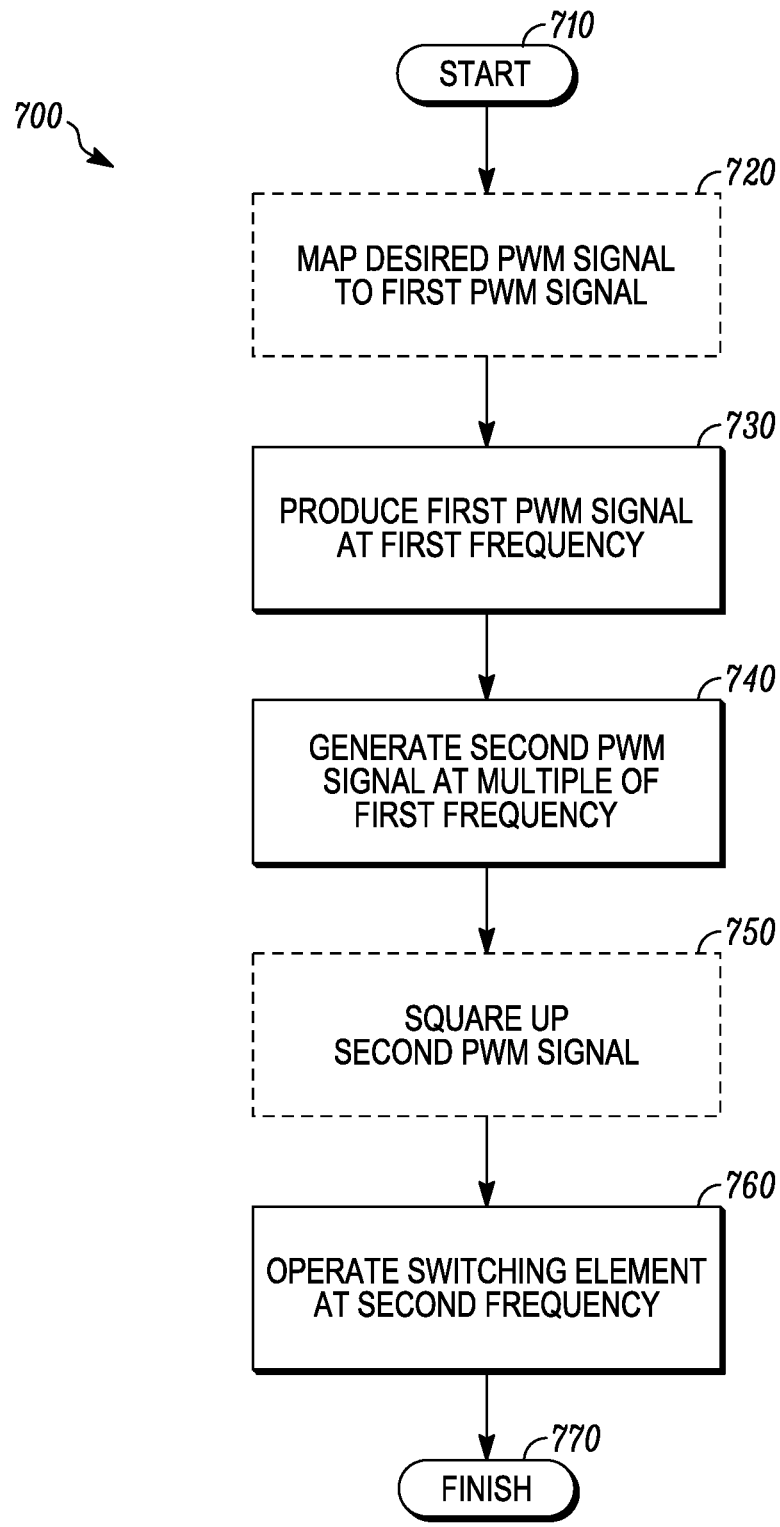
FIG. 7 is an example flowchart illustrating the operation of an apparatus according to a possible embodiment.

FIG. 7 is an example flowchart 700 illustrating the operation of the apparatus 100 according to a possible embodiment. At 710, the flowchart 700 can begin. At 720, a desired second pulse width modulation signal duty cycle can be mapped to a first pulse width modulation signal duty cycle. The mapping can be done using a look-up table, using a calculation, or by any other method of mapping a desired second pulse width modulation duty cycle to a first pulse width modulation signal to obtain the desired second pulse width modulation duty cycle after operations, such as harmonic filtering operations, are performed on the first pulse width modulation signal.

At 730, the first pulse width modulation signal can be produced at a first frequency from a pulse width modulation controller. The pulse width modulation controller can produce the first pulse width modulation signal with the first duty cycle to generate the second pulse width modulation signal with the second duty cycle for the switchmode power supply switching element.

At 740, a second pulse width modulation signal can be generated at a second frequency from the first pulse width modulation signal, where the second frequency can be a multiple of first frequency of the first pulse width modulation signal. For example, the second frequency can be at least one harmonic frequency of the first frequency that is equal to or greater than a second order harmonic of the first frequency. According to this example, the second frequency can include a third order harmonic frequency, a fifth order harmonic frequency, higher order harmonic frequencies, a single harmonic frequency, and/or a combination of harmonic frequencies. When generating the second pulse width modulation signal, at least one selected filtered harmonic frequency of the first frequency can be dynamically selected as the generated second frequency. For example, different harmonic frequencies can be selected when operating the apparatus 100 depending on desired operations. The second pulse width modulation signal can have a voltage and can be generated by a harmonic filter. The harmonic filter can have a quality factor greater than one to resonate up the voltage of the second pulse width modulation signal to switch a switchmode power supply switching element between on and off states.

The second pulse width modulation signal can be generated based on high-pass filtering out the first frequency and passing the second frequency, where the second frequency can be a harmonic of the first frequency. The second pulse width modulation signal can also be generated based on band-passing only one or more predetermined harmonics of the first frequency while filtering out the first frequency, where the second frequency is one of the predetermined harmonics of the first frequency. The second pulse width modulation signal can further be generated using a frequency multiplier diode, using of a heterodyne mixer, or using any other method to generate the second pulse width modulation signal with a frequency that is a multiple of the first pulse width modulation signal frequency.

At 750, the second pulse width modulation signal can be squared up. For example, the second pulse width modulation signal may have noise, may contain frequencies other than the second frequency, may be of insufficient amplitude, and/or may not be a square enough waveform. The second pulse width modulation signal can be squared up to make the second pulse width modulation signal more of a square wave to operate a gate of a switch.

At 760, a switching element of a switchmode power supply can be operated at a second frequency that is multiple of the first frequency of the first pulse width modulation signal, such as based on the second pulse width modulation signal, based on the squared up second pulse width modulation signal, or otherwise operated at the second frequency. For example, the switching element can include a control terminal and the second pulse width modulation signal can be provided to the control terminal of the power switching element to operate the switching element at the second frequency. The control terminal can be a gate of a FET, a base of a BJT, a terminal of IGBT, a terminal of TRIAC, or any other control terminal of a switching element. According to a possible embodiment, the switchmode power supply switching element can have a DC gate bias and the second pulse width modulation signal can be superimposed on the DC gate bias. At 770, the flowchart 700 can end.

All of the steps of the flowchart 700 are not necessary. For example, a desired pulse width modulation signal duty cycle can be mapped to a first pulse width modulation signal duty cycle as the first pulse width modulation signal frequency may be predetermined. As another example, the second pulse width modulation signal may not be squared up, as it already may be of sufficient quality to operate the switching element in the manner desired.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Embodiments can provide for an AC-coupled harmonic filter, to couple a higher order harmonic content of pulse width modulation drive signaling to a power switch gate, and to provide switching at rates faster than a digital controller would otherwise be able to create. Embodiments can also provide for mapping function to map an intended gate drive duty cycle to a required originating pulse width modulation signal duty cycle from a pulse width modulation controller.

Embodiments can further provide for operating power switching element(s) of a switch-mode power supply at a multiple of an output frequency of a pulse width modulation source output. This can permit desirable goals of low-cost pulse width modulation control sources, and low-cost/small-size switch-mode reactance components. The frequency multiplication can be performed entirely using passive circuit network(s), using active circuits, or using combinations of active and passive circuits. For example, a circuit network can be a high-pass filter that blocks out a fundamental pulse width modulation frequency but lets through a second low-order harmonic pulse width modulation frequency and all higher-order harmonic pulse width modulation frequencies, which can be used to craft a square or a triangle-wave drive to the gate of a switching element. The circuit network can also be a band-pass filter, which can pass only one or more pre-determined harmonics of the pulse width modulation drive signal. The circuit network can be switched to select different harmonic gate drive options. Also, the harmonic gate drive can be squared-up by comparator or other useful device for squaring up a signal. The comparator can have a fixed threshold, or a variable threshold operated by a digital control loop, such as by a leaky peak detector, a frequency-to-voltage converter, a Digital-to-Analog (D/A) converter or other element that can adjust a threshold. A function inside the digital control loop can map pulse width modulation source duty cycle(s) to the intended duty cycle of the power switch(es).

Embodiments can decrease switchmode power supply component size, and therefore material cost, when the operational frequency(ies) of the switch-mode power supply is increased. Embodiments can also provide further speed and cost improvements to otherwise maximum frequency-limited digital control solutions for digitally controlled switchmode supplies to provide performance and cost improvements. Embodiments can further enable low-voltage pulse width modulation controllers to directly operate semiconductor switching elements without interposing level shifters and buffers.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, one of ordinary skill in the art would be enabled to enabled to make and use the teachings of the disclosure to extend these single-phase switchmode supply embodiments presented herein to multi-phase switchmode power supplies; and to apply these teachings for use in other switchmode supply topologies other than the asynchronous boost converter topology presented herein, such as buck, buck-boost, flyback, and other switchmode supply topologies. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. An apparatus comprising:
   a pulse width modulation controller configured to produce a first pulse width modulation signal at a first frequency;
   a switchmode power supply switching element including a control terminal; and
   a harmonic filter coupled between the pulse width modulation controller and the control terminal of the switching element, the harmonic filter configured to provide a second pulse width modulation signal at a second frequency to the control terminal of the switching element, where the second frequency is higher than the first frequency wherein the second frequency is at least one harmonic frequency of the first frequency equal to or greater than a second order harmonic of the first frequency and wherein a fundamental first-order harmonic component of the first frequency in the first pulse width modulation signal is filtered out or attenuated by the harmonic filter to provide the second pulse width modulation signal.

2. The apparatus according to claim 1, wherein the second frequency is a multiple of the first frequency.

3. The apparatus according to claim 1, wherein the harmonic filter is dynamically configurable to select at least one selected filtered harmonic frequency of the first frequency as the second frequency.

4. The apparatus according to claim 1, further comprising a buffer coupled between the harmonic filter and the switchmode power supply switching element, the buffer configured to square up the second pulse width modulation signal.

5. The apparatus according to claim 1, wherein the second pulse width modulation signal has a voltage and the harmonic filter has a quality factor greater than one to resonate up the voltage of the second pulse width modulation signal to switch the switchmode power supply switching element between on and off states of the switchmode power supply switching element.

6. The apparatus according to claim 1,
   wherein the switchmode power supply switching element has a DC gate bias, and
   wherein the second pulse width modulation signal is superimposed on the DC gate bias.

7. The apparatus according to claim 1, further comprising a mapping module configured to map a desired second pulse width modulation signal second duty cycle to a first pulse width modulation signal first duty cycle, where the pulse width modulation controller produces the first pulse width modulation signal with the first duty cycle so the harmonic filter provides the second pulse width modulation signal with the second duty cycle to the switchmode power supply switching element.

8. The apparatus according to claim 1,
   wherein the pulse width modulation controller provides the first pulse width modulation signal at the first frequency to the harmonic filter, and
   wherein the harmonic filter is configured to generate the second pulse width modulation signal at the second frequency from the first pulse width modulation signal, where the second frequency is a multiple of the first frequency of the first pulse width modulation signal.

9. The apparatus according to claim 8, wherein the switchmode power supply switching element operates at the second frequency based on the second pulse width modulation signal.

10. The apparatus according to claim 1, wherein the harmonic filter comprises one of:
    a high-pass filter that filters out the first frequency and passes the second frequency, where the second frequency is a harmonic of the first frequency, and
    a band-pass filter that band-passes only one or more predetermined harmonics of the first frequency while filtering out the first frequency, where the second frequency is one of the predetermined harmonics of the first frequency.

11. A method comprising:
    producing a first pulse width modulation signal at a first frequency from a pulse width modulation controller;
    generating a second pulse width modulation signal by filtering out or attenuating a fundamental first-order harmonic component of the first frequency in the first pulse width modulation signal; and
    operating a switching element of a switchmode power supply based on the second pulse width modulation signal at a second frequency that is multiple of the first frequency of the first pulse width modulation signal;
    wherein the second frequency is at least one harmonic frequency of the first frequency that is equal to or greater than a second order harmonic of the first frequency.

12. The method according to claim 11,
    wherein the method further comprises dynamically selecting at least one selected filtered harmonic frequency of the first frequency as the generated second frequency.

13. The method according to claim 11, further comprising squaring up the second pulse width modulation signal, wherein operating comprises operating the switching element of the switchmode power supply at the squared up second frequency that is multiple of the first frequency of the pulse width modulation signal.

14. The method according to claim 11,
wherein the second pulse width modulation signal is generated by a harmonic filter,
wherein the second pulse width modulation signal has a voltage, and
wherein the harmonic filter has a quality factor greater than one to resonate up the voltage of the second pulse width modulation signal to switch a switchmode power supply switching element between on and off states.

15. The method according to claim 11,
wherein the switchmode power supply switching element has a DC gate bias, and
wherein the method further comprises superimposing the second pulse width modulation signal on the DC gate bias.

16. The method according to claim 11, further comprising mapping a desired second pulse width modulation signal second duty cycle to a first pulse width modulation signal first duty cycle,
wherein the pulse width modulation controller produces the first pulse width modulation signal with the first duty cycle to generate the second pulse width modulation signal with the second duty cycle for the switchmode power supply switching element.

17. The method according to claim 11,
wherein the switching element includes a control terminal, and
wherein the method further comprises providing the second pulse width modulation signal to the control terminal of the power switching element.

18. The method according to claim 11, wherein generating the second pulse width modulation signal is based on one of:

high-pass filtering out the first frequency and passing the second frequency, where the second frequency is a harmonic of the first frequency, and
band-passing only one or more predetermined harmonics of the first frequency while filtering out the first frequency, where the second frequency is one of the predetermined harmonics of the first frequency.

19. A switchmode power supply comprising:
a pulse width modulation controller configured to produce a first pulse width modulation signal at a first frequency;
a switchmode power supply switching element including a control terminal;
an energy storage element coupled to the switchmode power supply switching element;
a harmonic filter coupled between the pulse width modulation controller and the control terminal of the switching element, where the pulse width modulation controller provides the first pulse width modulation signal at the first frequency to the harmonic filter, and where the harmonic filter is configured to generate the second pulse width modulation signal at the second frequency from the first pulse width modulation signal by filtering out or attenuating a fundamental first-order harmonic component of the first frequency in the first pulse width modulation signal, where the second frequency is a harmonic of the first frequency of the first pulse width modulation signal that is equal to or greater than a second order harmonic of the first frequency, where the switchmode power supply switching element operates at the second frequency based on the second pulse width modulation signal to provide energy to the energy storage element.

* * * * *